US010979271B2

(12) United States Patent
Prothero

(10) Patent No.: US 10,979,271 B2
(45) Date of Patent: Apr. 13, 2021

(54) METHOD FOR WAVEFORM BANDWIDTH COMPRESSION

(71) Applicant: Astrapi Corporation, Dallas, TX (US)

(72) Inventor: Jerrold Prothero, Washington, DC (US)

(73) Assignee: Astrapi Corporation, Dallas, TX (US)

( * ) Notice: Subject to any disclaimer, the term of this patent is extended or adjusted under 35 U.S.C. 154(b) by 178 days.

(21) Appl. No.: 16/303,909

(22) PCT Filed: May 23, 2017

(86) PCT No.: PCT/US2017/033915
§ 371 (c)(1),
(2) Date: Nov. 21, 2018

(87) PCT Pub. No.: WO2017/205319
PCT Pub. Date: Nov. 30, 2017

(65) Prior Publication Data
US 2020/0322205 A1 Oct. 8, 2020

Related U.S. Application Data

(60) Provisional application No. 62/340,104, filed on May 23, 2016.

(51) Int. Cl.
*H04L 27/10* (2006.01)
*H04L 27/26* (2006.01)
*H04L 27/18* (2006.01)

(52) U.S. Cl.
CPC .......... *H04L 27/2639* (2013.01); *H04L 27/10* (2013.01); *H04L 27/18* (2013.01)

(58) Field of Classification Search
CPC ..... H04L 27/00; H04L 27/2639; H04L 27/10; H04L 27/18; H04L 27/34
See application file for complete search history.

(56) References Cited

U.S. PATENT DOCUMENTS

2006/0227701 A1* 10/2006 Johnson ................. H04L 7/027
370/210
2008/0304666 A1 12/2008 Chester et al.
(Continued)

FOREIGN PATENT DOCUMENTS

| EP | 3 345 359 A1 | 7/2018 |
| WO | 2010/004586 A2 | 1/2010 |
| WO | 2017/040996 A1 | 3/2017 |

OTHER PUBLICATIONS

International Search Report and Written Opinion dated Aug. 9, 2017 in corresponding International Application No. PCT/US2017/033915; 8 pages.

(Continued)

*Primary Examiner* — Rahel Guarino
(74) *Attorney, Agent, or Firm* — Maier & Maier, PLLC

(57) ABSTRACT

A method for waveform bandwidth compression (WBC) and a system configured to perform the method, which may include the steps of: processing information to produce an input sequence of real-valued amplitude signals; fitting a polynomial to the input sequence covering at least one transmission time interval; converting the polynomial to a transmission signal comprising a sum of sinusoids with continuously time-varying amplitudes; transmitting the transmission signal; and receiving the transmission signal as a time-amplitude sequence. This method may significantly improve the spectral efficiency of existing transmission systems, while at the same time requiring only minimal modification to traditional radio architecture design.

15 Claims, 4 Drawing Sheets

(56) References Cited

U.S. PATENT DOCUMENTS

2011/0222584 A1  9/2011  Michaels
2012/0076098 A1  3/2012  Han et al.
2015/0156049 A1  6/2015  Prothero

OTHER PUBLICATIONS

Search Report dated Jan. 20, 2020 in corresponding European Application No. 17803389.0; 10 pages.
Konrad Piwnicki, "Modulation Methods Related to Sine-Wave Crossings", IEEE Transactions on Communications, vol. COM-31, No. 4, Apr. 1983, pp. 503-508.
Dr. Jerrold Prothero, "The Shannon Law for Non-Periodic Channels", May 2, 2012, 30 pages.
Office Action dated Nov. 17, 2020 in corresponding Canadian Application No. 3,059,190; 4 pages.
Office Action dated Oct. 22, 2020 in corresponding European Application No. 17 803 389.0; 6 pages.

* cited by examiner

METHOD FOR WAVEFORM BANDWIDTH COMPRESSION

CROSS-REFERENCE TO RELATED APPLICATIONS

This application is the National Stage of International Application No. PCT/US2017/033915, filed May 23, 2017, which claims priority from U.S. Provisional Patent Application No. 62/340,104, filed on May 23, 2016, entitled "Method for Waveform Bandwidth Compression," the entire contents of which are hereby incorporated by reference.

BACKGROUND

Applicant's prior U.S. Pat. No. 8,472,534 entitled "Telecommunication Signaling Using Non-Linear Functions" and U.S. Pat. No. 8,861,327 entitled "Methods and Systems for Communicating", the contents of which are herein incorporated by reference in their entirety, introduced spiral-based signal modulation. Spiral-based signal modulation may base signal modulation on complex spirals, rather than the traditional complex circles used by standard signal modulation techniques such as Quadrature Amplitude Modulation (QAM) and Phase-Shift Keying (PSK).

Several of Applicant's prior provisional and nonprovisional patent applications, U.S. Provisional Patent Application No. 62/213,418, entitled "Spiral Polynomial Division Multiplexing," U.S. patent application Ser. No. 15/255,944, entitled "Spiral Polynomial Division Multiplexing," and U.S. Provisional Patent Application No. 62/256,532, entitled "Method for Determining Instantaneous Spectral Usage", the contents of which are herein incorporated by reference in their entirety, introduced a novel method called "Instantaneous Spectral Analysis" (ISA). ISA is a method that may be used to decompose an arbitrary polynomial, which may represent a signal, into a sum of complex spirals, which may have a real-valued representation as a sum of sinusoids, each of which may have a continuously-varying amplitude. ISA introduced a method for identifying and grouping sinusoids with the same frequency together, such that the amplitude and power associated with each sinusoidal frequency at each instant in time in the spiral representation of a particular polynomial may be readily apparent.

Traditional techniques for determining spectral usage from a time domain sequence of amplitudes, including most notably the Fourier Transform (FT), typically do so by averaging spectral information over some period of time, resulting in a representation of the time domain using sinusoids with constant amplitude. However, ISA may allow the same time domain to be represented using a much smaller sinusoidal frequency range ("bandwidth") than is necessary using an FT. As digital communications may be considered to be based on the transmission of a time-domain sequence of amplitude values using bandwidth, and as bandwidth may be a very valuable resource, a method that may allow for more spectrally-efficient signal transmission may be desirable. Further, a method may be desirable for allowing higher spectral efficiency to be achieved while requiring as little change to existing radio architecture design as possible.

SUMMARY

Applicant's prior patent applications noted above disclosed the use of polynomials to describe signals, and the representation of these polynomials in terms of sums of complex spirals, using ISA. While the ISA technique may have general applicability, prior patents have focused particularly on the use of ISA within the context of a new signal modulation method introduced by the applicant called "Spiral Polynomial Division Multiplexing" (SPDM). However, ISA may also be used for bandwidth compression of information, or data, in conjunction with traditional signal modulation methods which may include Phase-Shift Keying (PSK), Frequency-Shift Keying (FSK), Quadrature Amplitude Modulation (QAM), Orthogonal Frequency Division Multiplexing (OFDM), and all or essentially all other traditional modulation formats.

According to an exemplary embodiment of a method for waveform bandwidth compression, the traditional modulation method may generate signal time domain amplitude sequences which can be represented by a polynomial, a condition which has general applicability. ISA may be applied to bandwidth compression of the transmissions of traditional modulation methods by the method of "Waveform Bandwidth Compression" (WBC) disclosed herein.

WBC may include a novel application of ISA, in which a time-domain amplitude sequence which may be generated by PSK or other traditional modulation methods is analyzed using ISA, which may occur before the Digital-to-Analog Conversion (DAC) step in the transmitter. Instead of transmitting the time-domain sequence for a particular Transmission Time Interval (TTI) using sinusoids with constant coefficients, WBC may allow the same time-domain sequence of amplitude values to be transmitted with much higher spectral efficiency using sinusoids with continuously-varying amplitude generated by ISA. The WBC approach may require no change in the amplitude sequences generated by traditional transmitters, and little or no modification to traditional receivers. WBC may therefore provide a method to significantly improve spectral efficiency of existing transmission systems while requiring minimal modification to traditional radio architecture design.

In particular, the method may include performing the following steps. First, an input sequence of real-valued amplitude signals may be received, or information may be processed to produce an input sequence of real-valued amplitude signals. Next, a polynomial may be fit to the input sequence, over the span of at least one transmission time interval. Next, the polynomial may be converted to a transmission signal, which may be formed from a sum of sinusoids with continuously time-varying amplitudes. The transmission signal may then be transmitted, and may be received as a time-amplitude sequence.

The step of converting the polynomial to a transmission signal may make use of instantaneous spectral analysis, which as mentioned may be discussed in more detail in the patent applications incorporated by reference. Specifically, instantaneous spectral analysis may entail projecting the polynomial onto Cairns series functions orthogonal in polynomial coefficient space; converting the polynomial from a function described by the Cairns series functions to a function described by Cairns exponential functions; and combining, into a sum of sinusoids (such as the transmission signal), frequency information contained within a function described by the Cairns exponential functions.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION OF THE EMBODIMENTS

Figure 1A:
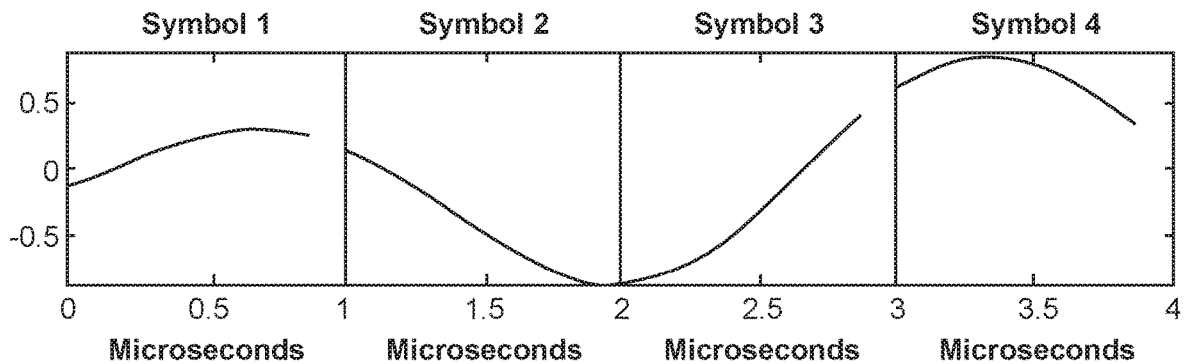
FIG. 1A may show an exemplary application of WBC to reducing the bandwidth requirements of Quadrature Phase Shift Keying (QPSK), and specifically may show a random sequence of four QPSK symbol waveforms at baseband.
Figure 1B:
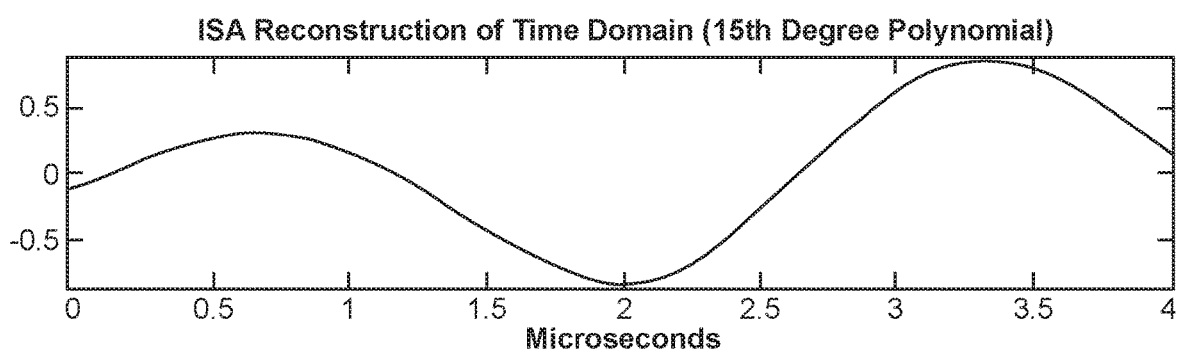
FIG. 1B may show an exemplary application of WBC to reducing the bandwidth requirements of Quadrature Phase Shift Keying (QPSK), and specifically may show a polynomial fit to a complete QPSK four symbol waveform sequence.
Figure 1C:
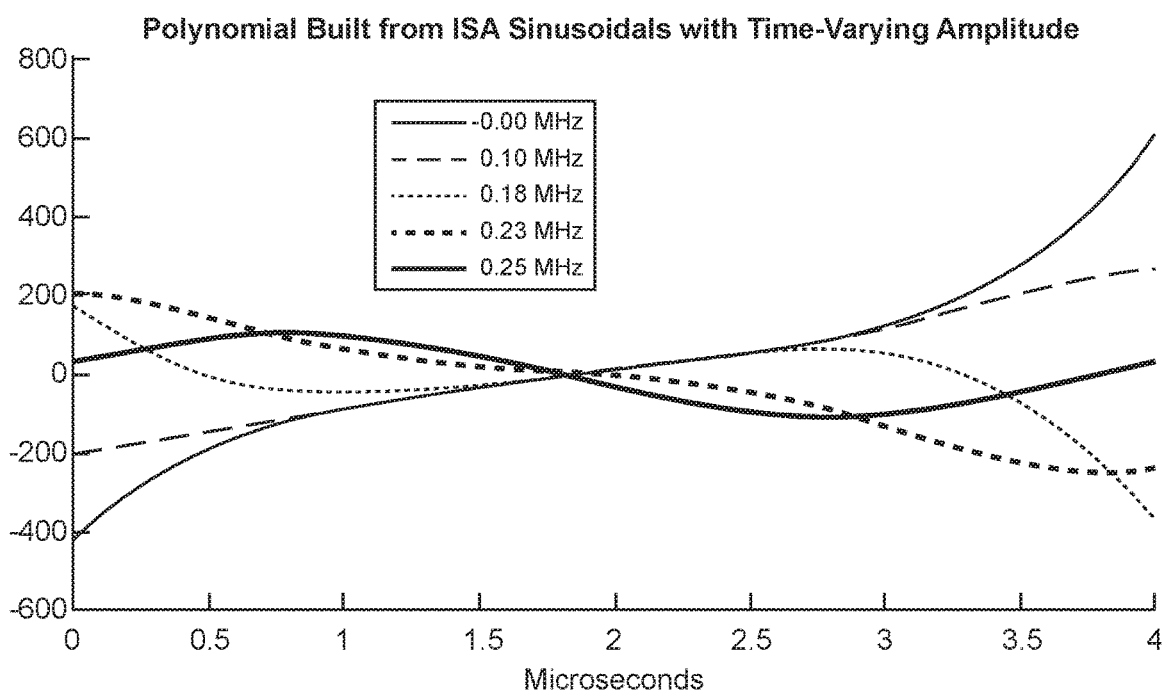
FIG. 1C may show an exemplary application of WBC to reducing the bandwidth requirements of Quadrature Phase Shift Keying (QPSK), and specifically may show a set of ISA-generated sinusoids with positive frequencies and which may have varying amplitudes.
Figure 1D:
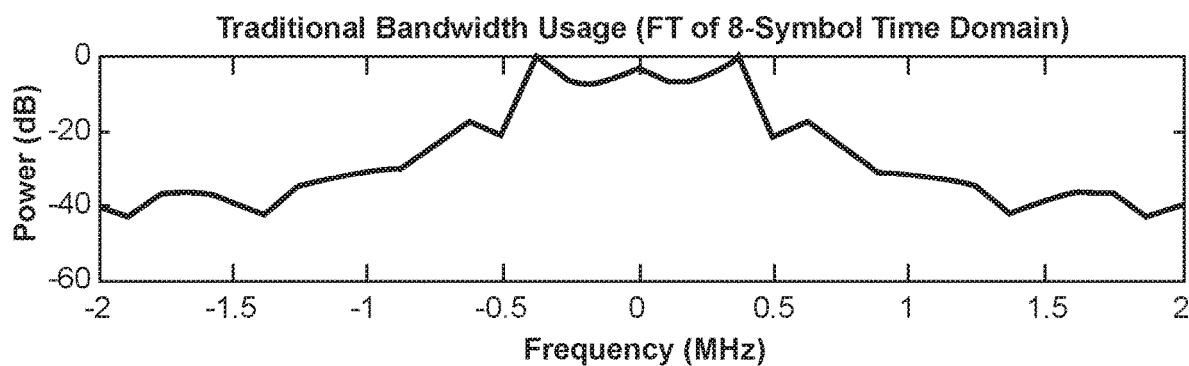
FIG. 1D may show an exemplary application of WBC to reducing the bandwidth requirements of Quadrature Phase Shift Keying (QPSK), and specifically may show the Fourier transform of a QPSK time domain which includes a sequence of symbol waveforms of the type shown in FIG. 1A.
Figure 1E:
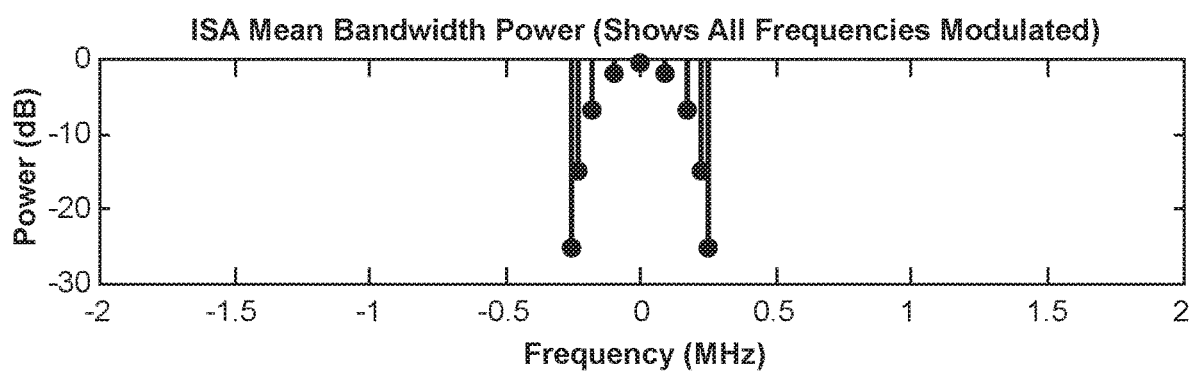
FIG. 1E may show an exemplary application of WBC to reducing the bandwidth requirements of Quadrature Phase Shift Keying (QPSK), and specifically may show a representation of the QPSK time domain shown in FIG. 1A.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by field programmable gate arrays, by program instructions being executed by one or more processors, or by a combination thereof. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

According to an exemplary embodiment, a method to modify signal transmission of traditional signal modulation methods may be contemplated. Such a method may be termed "Waveform Bandwidth Compression" (WBC) because it reduces the bandwidth requirements for transmitting a particular time-domain waveform when compared to traditional signal modulation.

According to an exemplary embodiment, WBC may take as input the sequence of time-domain amplitude values that might be generated in a transmitter employing traditional signal modulation methods, such as but not limited to PSK, FSK, QAM, or OFDM. WBC may be compatible with many different types of traditional signal modulation, and no further assumptions may be required concerning the nature of this signal modulation.

As an output, WBC may return a set of sinusoids of differing frequencies (the "frequency domain"), each of which has continuously time-varying amplitude. Summing the product of each sinusoid with its amplitude may allow the time domain amplitude sequence generated by PSK or other modulation techniques to be precisely reconstructed at each point in time.

According to some exemplary embodiments, WBC may include the following steps. First, a polynomial may be fit to the input sequence of real-valued amplitudes generated by a traditional transmitter. The input sequence may be a digital waveform having real-valued amplitudes representative of data or information to be transmitted or data and a clock. The polynomial may cover one or more Transmission Time Intervals (TTI's). Second, the polynomial may be converted into a sum of sinusoids with continuously time-varying amplitudes using the ISA method disclosed in applicant's prior patent applications. Third, the resulting ISA representation ("transmission signal") may be transmitted by the traditional transmitter. Fourth, the traditional receiver paired with the traditional transmitter may receive the transmission signal. Fifth, if the traditional receiver requires only the time-amplitude sequence intended by the traditional transmitter, it may be able to process the transmission signal as if it had been constructed using the traditional method of sinusoids with constant amplitude. Sixth, if the traditional receiver requires a representation of the signal in terms of sinusoids with constant amplitude as may be provided by traditional modulation, the receiver may be able to obtain this representation from an FT of the transmission signal. This may take advantage of the fact that the time-domain amplitude sequence may have identical representations in terms of ISA and a FT. So that while the amplitude sequence was transmitted using an ISA representation, it may be reconstructed by the traditional receiver as if it had been transmitted using a traditional representation.

Exemplary FIGS. 1A through 1E may show an exemplary application of WBC technology to reducing the bandwidth requirements of Quadrature Phase Shift Keying (QPSK) to approximately 25% of its spectral occupancy using standard signal transmission techniques. In other words, WBC may increase the spectral efficiency in this application by a factor of four. Exemplary FIG. 1A may show a random sequence of four QPSK symbol waveforms at baseband with a simulated 1 MHz of bandwidth and 1 Microsecond time duration for each QPSK symbol waveform. Exemplary FIG. 1B may show a polynomial fit to the complete QPSK four symbol waveform sequence, which may provide an equivalent representation of the QPSK four symbol time domain. Exemplary FIG. 1C may show a set of ISA-generated sinusoids with positive frequencies which may have continuously-varying amplitudes. The sum of these sinusoids, together with matched negative frequency sinusoids, may accurately reconstruct the time domain amplitude sequences in FIG. 1A and FIG. 1B. The waveforms in FIG. 1C may use no sinusoids with frequencies above 0.25 MHz. Exemplary FIG. 1D may show the FT of a QPSK time domain consisting of a sequence of symbol waveforms of the type shown in FIG. 1A. Specifically, FIG. 1D may show significant spectral occupancy out to at least 1 MHz. Exemplary FIG. 1E may show a representation of the QPSK time domain shown in FIG. 1A that may indicate no power in sinusoids with frequencies higher than 0.25 MHz. This may indicate that the bandwidth usage implied by an ISA representation of a QPSK symbol waveform sequence is much less than the bandwidth usage implied by an FT representation of a QPSK symbol waveform sequence.

Figure 2:
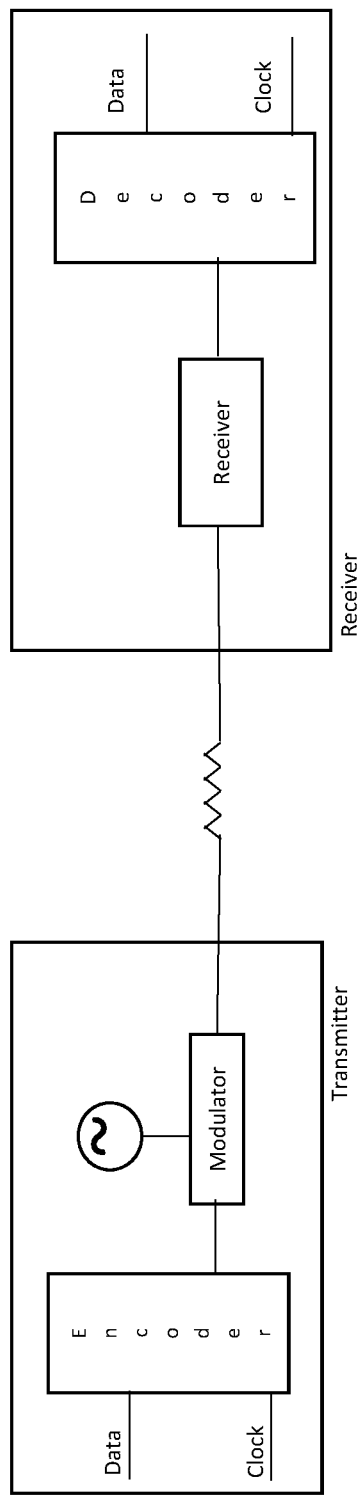
FIG. 2 may show an exemplary transmitter and receiver pair that may be configured to include WBC technology.
Figure 3:
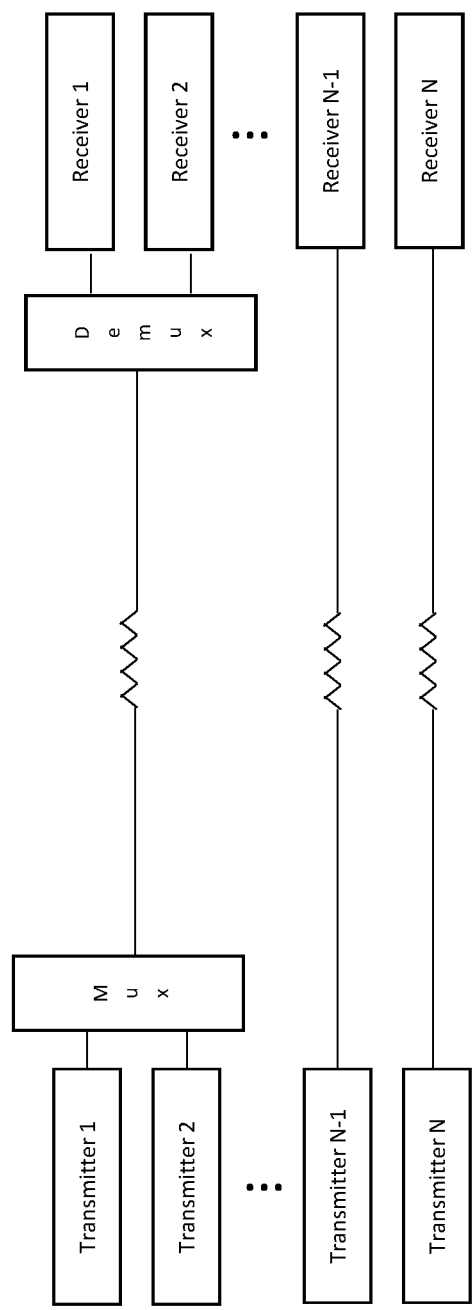
FIG. 3 may show an exemplary system or network including a plurality of transmitter and receiver pairs, some of which may be configured to include WBC technology.

FIG. 2 may show an exemplary transmitter and receiver pair used in a transmission or communication system, such as shown in FIG. 3. WBC technology may be implemented in the Encoder section of the transmitter, which may also include traditional signal modulation encoding of the information being transmitted. The encoded signal may then be used to modulate a carrier provided by a carrier source using an external modulation as shown in FIG. 2 or to directly modulate the carrier source to produce the transmission signal. While the Encoder and Decoder are shown as single blocks in FIG. 2, it will be appreciated that the Encoder and Decoder may include one or more stages/components that are used to process the information passing through the system, as desired by the skilled artisan.

At the receiver, a receiver may receive the transmission signal and provide the transmission signal to a decoder that may perform any decoding necessary to output the information, which may be in the form of data and clock signals.

FIG. 3 shows a plurality of transmitters and receivers that may be deployed in various wired and wireless transmission and communication systems that may include WBC technology. For example, these systems may include various electrical and optical wired transmission and communication networks, as well as satellite and terrestrial wireless networks. In various systems, the transmission signals may be multiplexed before transmission and may require demultiplexing after transmission, as is commonly performed in wired systems carrying multiple channels.

WBC technology of the present invention may be implemented in all of the transmitters and receivers in a system or network or only some portion of the transmitters and receivers in the system or network. In the manner, the WBC technology of the present invention may be rolled into new network builds, as well as retrofitted into existing networks to provide additional capacity in existing networks that include transmitters and receivers employing traditional signal modulation technology. Transmitters and receivers, according to exemplary embodiments of the present invention, may be deployed in existing networks to provide additional capacity in networks with unused channels. In addition, one or more transmitter and receiver pairs, according to exemplary embodiments of the present invention, may be used to replace a traditional transmitters and receivers already deployed in existing networks to provide additional capacity.

In a further exemplary embodiment, a method of transmitting information may be disclosed. Information may be processed to produce an input sequence of real-valued amplitude signals. A polynomial may be fitted to the input sequence covering at least one transmission time intervals. The polynomial may be converted to a transmission signal comprising a sum of sinusoids with continuously time-varying amplitudes. The transmission signal may be transmitted and the transmission signal may be received as a time-amplitude sequence. The received time-amplitude sequence may be further converted into at least one sinusoidal signal with constant amplitude. This may be done, for example, by adjusting the amplitudes of the received time-amplitude sequence to be a constant amplitude, in effect adjusting the time-amplitude sequence to be a transmission signal such as could have been constructed using the traditional method of sinusoids with constant amplitude.

In a further exemplary embodiment, a method of transmitting information may be disclosed. A polynomial may be fitted to an input sequence covering at least one transmission time intervals. The polynomial may be converted to a transmission signal comprising a sum of sinusoids with continuously time-varying amplitudes. The transmission signal may be transmitted and the transmission signal may be received as a time-amplitude sequence wherein receiving includes performing a Fourier Transform of the received transmission signal.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for communicating, comprising:
   generating an input sequence of real-valued amplitude values;
   fitting a polynomial to the input sequence, the fitted polynomial spanning at least one transmission time interval;
   converting the polynomial to a transmission signal, the transmission signal comprising a sum of sinusoids-having a continuously time-varying amplitude; and
   transmitting, with a transmitter, the transmission signal.

2. The method of claim 1, further comprising:
   receiving, at a receiver, the transmission signal as a time-amplitude sequence; and
   converting the received time-amplitude sequence into at least one sinusoidal signal, the at least one sinusoidal signal having a constant amplitude.

3. The method of claim 2, wherein the step of converting the received time-amplitude sequence into at least one sinusoidal signal comprises performing a Fourier transformation on the transmission signal.

4. The method of claim 1, wherein the step of generating the input sequence of real-valued amplitude values comprises performing signal modulation using at least one of phase-shift keying (PSK) modulation, frequency-shift keying (FSK) modulation, quadrature amplitude modulation (QAM), or orthogonal frequency-division multiplexing (OFDM) modulation.

5. The method of claim 1, wherein the transmitter comprises an encoder, the encoder comprising a processor and a memory, the memory comprising instructions that, when executed, cause the processor to encode data according to at least one of PSK, FSK, QAM, and ODFM.

6. The method of claim 1, wherein the step of converting the polynomial to the transmission signal comprises using instantaneous spectral analysis, and comprises:
projecting the polynomial onto Cairns series functions;
converting the polynomial from a function described by the Cairns series functions to Cairns exponential functions; and
combining, into the transmission signal, frequency information contained in the Cairns exponential functions.

7. A method for communicating, comprising:
converting a polynomial representing a signal time domain amplitude sequence to a transmission signal comprising a sum of sinusoids having a continuously time-varying amplitude; and
transmitting, with a transmitter, the transmission signal.

8. The method of claim 7, further comprising:
receiving, at a receiver, the transmission signal as a time-amplitude signal; and
converting the time-amplitude signal into at least one sinusoidal signal, the at least one sinusoidal signal having a constant amplitude.

9. The method of claim 8, wherein the step of converting the time-amplitude signal into at least one sinusoidal signal comprises performing a Fourier transformation on the transmission signal.

10. The method of claim 7, wherein the step of converting the polynomial to the transmission signal comprises using instantaneous spectral analysis, and comprises:
projecting the polynomial onto Cairns series functions;
converting the polynomial from a function described by the Cairns series functions to Cairns exponential functions; and
combining, into the transmission signal, frequency information contained within the Cairns exponential functions.

11. A system comprising an encoder and a transmitter, the encoder comprising a processor and a non-transitory computer-readable memory, the memory comprising instructions that, when executed, cause the system to perform the steps of:
generating an input sequence of real-valued amplitude values;
fitting a polynomial to the input sequence, the fitted polynomial spanning at least one transmission time interval;
converting the polynomial to a transmission signal, the transmission signal comprising a sum of sinusoids-having a continuously time-varying amplitude; and
transmitting, with the transmitter, the transmission signal.

12. The system of claim 11, further comprising a receiver and a decoder, the decoder comprising a processor and a non-transitory computer-readable memory, the memory comprising instructions that, when executed, cause the system to perform the steps of:
receiving, at the receiver, the transmission signal as a time-amplitude sequence; and
converting the received time-amplitude sequence into at least one sinusoidal signal, the at least one sinusoidal signal having a constant amplitude.

13. The system of claim 12, wherein the step of converting the received time-amplitude sequence into at least one sinusoidal signal comprises performing a Fourier transformation on the transmission signal.

14. The system of claim 11, wherein the step of generating the input sequence of real-valued amplitude values comprises performing signal modulation using at least one of phase-shift keying (PSK) modulation, frequency-shift keying (FSK) modulation, quadrature amplitude modulation (QAM), or orthogonal frequency-division multiplexing (OFDM) modulation.

15. The system of claim 11, wherein the step of converting the polynomial to the transmission signal comprises using instantaneous spectral analysis, and comprises:
projecting the polynomial onto Cairns series functions;
converting the polynomial from a function described by the Cairns series functions to Cairns exponential functions; and
combining, into the transmission signal, frequency information contained within the Cairns exponential functions.

* * * * *